Sept. 19, 1950 R. H. SHIVELY 2,522,903
BRAKE OPERATING AND ADJUSTING MECHANISM
Filed Feb. 19, 1948 2 Sheets-Sheet 1
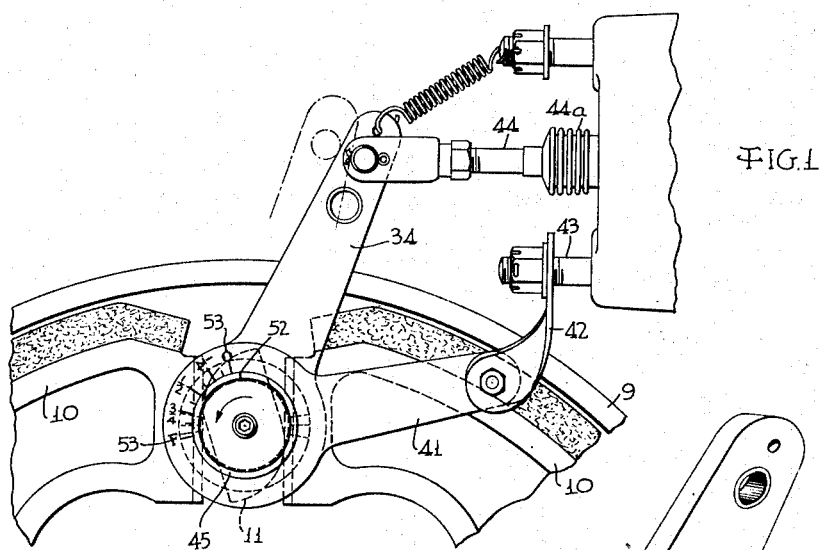
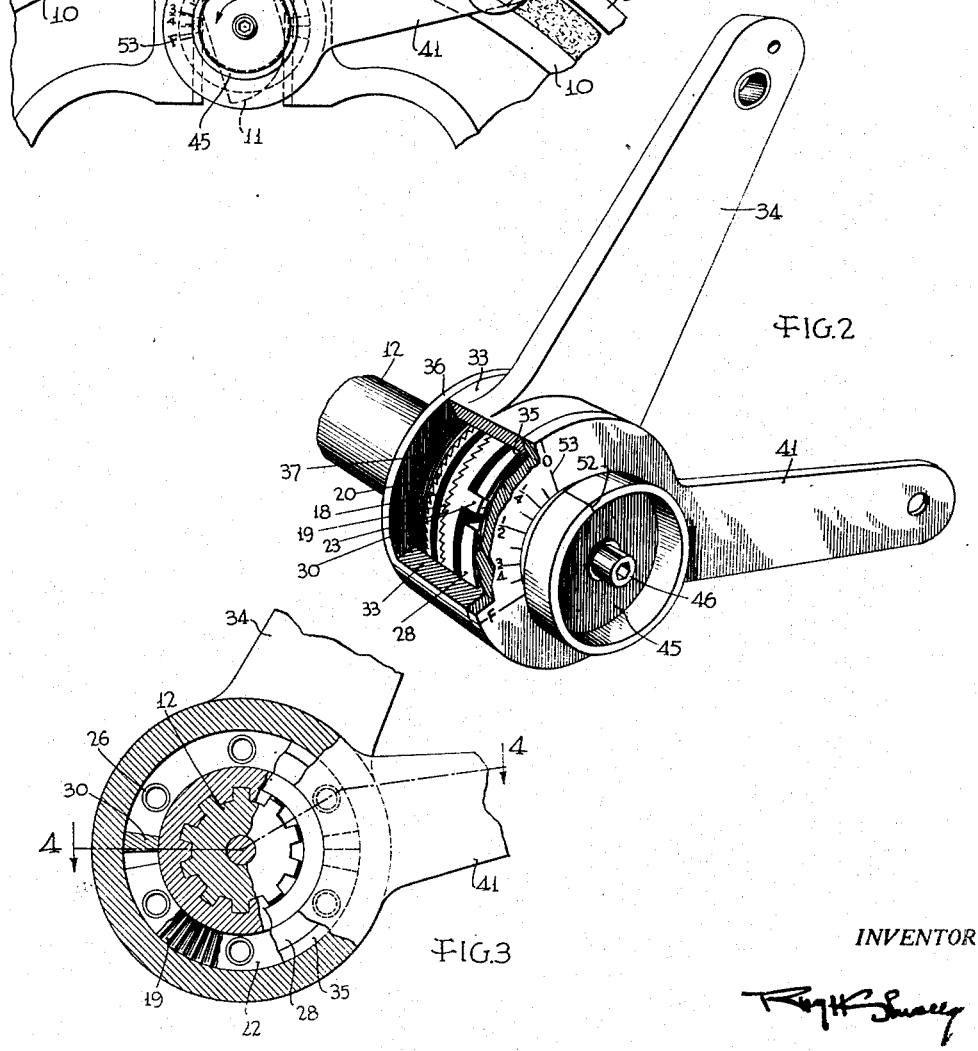
INVENTOR Sept. 19, 1950 R. H. SHIVELY 2,522,903
BRAKE OPERATING AND ADJUSTING MECHANISM
Filed Feb. 19, 1948 2 Sheets-Sheet 2
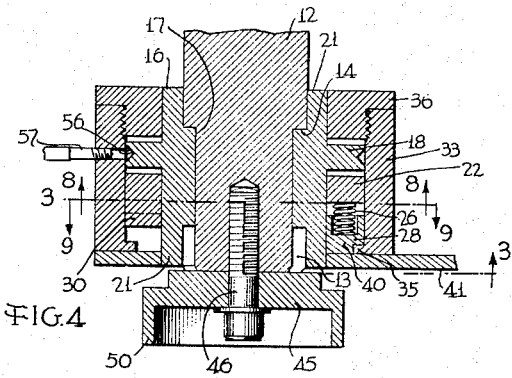
INVENTOR
Roy H Shively Patented Sept. 19, 1950

2,522,903

UNITED STATES PATENT OFFICE 2,522,903

BRAKE OPERATING AND ADJUSTING MECHANISM

Roy H. Shively, Scranton, Pa.

Application February 19, 1948, Serial No. 9,533

9 Claims. (Cl. 188—79.5)

This invention relates to brake operating and adjusting apparatus adapted to adjust a brake operating cam to compensate for brake lining wear so as to keep the brake action uniform, and has for an object the provision of improvements in this art.

One of the particular objects of the invention is to provide brake adjusting mechanism which is self-contained as a unit adapted to be introduced and removed without disassembly.

Another object is to provide a fully enclosed dust excluding housing or casing in which the outer portion is connected to the cam operating arm in a balanced location.

Another object is to provide an economical assembly by forming adjusting pawl teeth on an end wall or cap of the housing or casing.

Another object is to provide means for releasing teeth of the ratchet mechanism inside the casing without opening the casing.

Another object is to provide a retainer which in one position holds the casing on the cam shaft and in another position forces the casing axially along the shaft and relatively to the ratchet gear secured on the cam shaft to disengage the ratchet mechanism.

The above and other objects and advantages of the invention will be apparent from the following description of an exemplary embodiment, reference being made to the accompanying drawings, in which:

Fig. 1 is an elevational view showing a brake cam and its operating and adjusting mechanism according to the present invention;

Fig. 2 is a perspective view, partly cut away to show parts inside the casing;

Fig. 3 is a transverse section taken about on the line 3—3 of Fig. 4;

Fig. 4 is a longitudinal section taken on the line 4—4 of Fig. 3;

Fig. 5 is a longitudinal section through the casing and an elevation of interior parts as viewed from the left side of Figs. 3 and 4;

Fig. 6 is a view similar to Fig. 5 but showing the position of parts when the brake is fully actuated and at a stage when the brake adjuster is about to take up a tooth for brake wear;

Fig. 7 is a longitudinal section and elevation of the mechanism released for re-setting, as when the brakes have been relined;

Fig. 8 is a transverse section on the line 8—8 of Fig. 4;

Fig. 9 is a transverse section on the line 9—9 of Fig. 4; and

Fig. 10 is a longitudinal section similar to Fig. 4 showing a modification.

In the drawings the brake drum is represented by the numeral 9, the brake shoes by the numeral 10, the cam for actuating the shoes by the numeral 11, and the cam shaft by the numeral 12. The cam shaft has at the end splines 13 which are shouldered, as at 14, to provide an end stop for the brake adjusting mechanism which is secured thereon, specifically for the hub 16 and the intermediately raised internal splines 17 of a double faced cam operating ratchet gear 18. The teeth of the ratchet gear 18 are formed in annular radial series 19, 20 on the ends or side thereof. The hub 16 on each side of the gear drum is provided with projecting ends or hub extensions 21.

Turnably mounted on the cylindrical exterior of one of the ends 21 of the hub 16 is an annular toothed adjusting pawl 11, the teeth 23 of which engage the series of adjusting teeth 19 of the cam shaft ratchet gear drum 18. The adjusting pawl 22 also has axial movement on the cylindrical end 21 of the hub 16 of the cam shaft ratchet gear. The adjusting pawl 22 is urged against the side teeth 19 of the cam shaft ratchet gear drum by a plurality of springs 26 carried in pockets 27 of an annular anchor ring 28 which is also mounted on and for relative turning movement with respect to the cylindrical end 21 of the cam shaft ratchet gear.

The anchor ring 28 is also provided with one or more arcuate notches 29 within which one or more projections 30 of the adjusting pawl may oscillate. The angle of oscillation is approximately the same as the angle of minimum movement required for the cam shaft in actuating the brakes. It is to be understood that the springs, projections and notches might be transposed from one member to the adjacent member, that is from anchor ring to adjusting pawl or the reverse.

The cam ratchet gear drum 18, the adjusting pawl 22, and the anchor ring 28 are cylindrical on their outer peripheries and are surrounded by an interiorly cylindrical casing 33, to the exterior of which is secured in a mid-length position for operating balance a cam operating arm 34. The parts within the casing 33 are retained by an inwardly extending casing flange 35 at one end and by a cap 36 at the other end. The cap is shown to be threaded, as at 37, into the end of the casing and it may be locked on by screws or the like, if desired. It is so threaded and mounted as to be tightened rather than loosened during operation, hence it has a natural tendency to keep a fixed position even if locking means are not provided for it. The cap 36, or an interior part carried thereby and non-rotatable relative to the casing in final assembled position, carries an annular toothed operating pawl 39 which co-operates with the series of teeth 20 on the end of the cam ratchet gear drum 18. This end, which is nearer the cam, will be referred to as the inner end; the other as the outer end.

The cap 36 fits around a cylindrical end 21 of the hub 16. At the other end the anchor ring 28 has a reduced annular portion 40 which fits between the casing flange 35 and the end 21 of the hub 16. To the outer end of the portion 40 there is secured an anchor arm 41. The anchor arm 41 at its outer end is secured to some fixed part, as by a bracket 42 and bolt 43. The cam operating arm 34 at its outer end is connected with a power operator 44, shown as being operated by a fluid diaphragm motor 44a.

The hub 16 of the cam ratchet gear drum 18 is retained on the cam shaft 12 by a cap 45 and a screw 46 which is threaded into the end of the cam shaft. The casing 33 has axial movement relative to the cam shaft, hub and cam ratchet gear drum 18, but since the end members of the casing retain the casing about the cam ratchet gear drum 18 and related parts, it cannot be separated from the assembly except by disassembly of the casing. However, the whole assembly of casing, hub and related parts can be removed as a unit by removing the cap 45, if the cam arm 34 and the anchor arm 41 are also disconnected from parts to which they are attached at their outer ends.

The cap 45 on its outer side is formed with annular flange means, either in full annular end flange 50, as shown, or some part of this (as when cut out to leave spaced arcuate projections) which fits the annular end 40 or parts secured thereto outside the hub end 21. The cap may be taken off and reversed and the screw replaced and tightened and this action will force the casing further down along the cam shaft and the farther end of the casing away from the cam ratchet gear drum 18 and its operating teeth 20 to permit the cam ratchet gear to be turned relative to the casing and the operating pawl teeth 39 of its cap 36. By disconnecting the anchor arm from its holding parts 42, 43, the cam ratchet gear drum 18, cam shaft 12, and cam 11 may be turned to any desired position. For example, the cam may be brought back to initial position which it should occupy when the brake shoes are newly relined.

When the cap 45 is now removed, the anchor arm 41 may be turned with its entrained anchor ring 28 and adjusting pawl 22 in non-holding direction to bring the arm back to anchoring position to be secured by the parts 42, 43. The cap may be again reversed and secured to the end of the cam shaft after the anchor arm has been turned and secured.

The anchor arm maintains control over the cam shaft and cam while the operating pawl teeth 39 and cam ratchet gear teeth 20 are adjusted relative to each other because the anchor arm side of the casing is pressed against the side of the cam ratchet gear drum 18 by the reversed cap in the action described. This action takes care of either a small readjustment, as when by excessive fluid pressure or otherwise the device may have taken up a tooth too many, or a large adjustment, as when the brake shoes have been relined.

The cap 45 may be made of small diameter on its normally inner side so as to overlie only the end of the camshaft and the end of the part 21 of the ratchet gear drum 18 carried thereon so that the cap may be clamped to the cam shaft and not engage the casing or anchor arm or anchor ring to produce friction therewith.

The cap 45 may have elements adapted to engage the end of the cam shaft to prevent turning movement relative thereto. This is useful when, as shown, the cap and anchor facing are provided with cooperating marks 52, 53 to indicate how much take-up from initial (new-lined) position has been made on the cam shaft.

The cam gear drum 18 may be provided with an annular grease groove 56 over the end of a hole from a grease gun fitting 57 on the casing.

In the form of device shown in Figs. 1 to 9, the anchor ring 28 is retained in the casing by the annular flange 35 and can only be inserted from the cap end (inner end) of the casing. When the anchor ring is in proper position it may have the anchor arm 41 secured to it by screws, soldering, welding, or otherwise. The arm 41 is here shown to have a hub portion as large in diameter as the casing 33 but it may be smaller so long as it has full attachment to the anchor ring 28.

In the modification shown in Fig. 10, the permanent annular flange 35 of the first form is replaced by a removable flanged end cap 35'. In this second form the anchor ring 28' may be inserted in the near end of the casing 33'. After insertion, the flanged cap 35' is screwed on the casing. Then the hub of the anchor arm 41' is secured to the anchor ring 28', as by screws 61. In this form the caps 35' and 36' are locked in position by lock screws 60. The other parts are the same as before and are denoted by the same references but with a prime (') added.

It is thus seen that the invention provides a simple, sturdy device which is easy to manufacture and assemble and which is dependable in service. It is also easily re-set without requiring complete disassembly and removal.

While certain embodiments have been described, it will be understood that there may be various embodiments within the limits of the prior art and the scope of the subjoined claims.

I claim:

1. Brake operating and adjusting mechanism comprising in combination, a casing, a cam shaft entering said casing, a cam shaft operating ratchet gear disposed within said casing and secured on said cam shaft for turning it and held against axial movement thereon in one direction, said ratchet gear having ratchet teeth on each end, a casing cap fast on one end of said casing, said casing cap having operating pawl teeth for mating with the ratchet gear teeth on one end face of said ratchet gear, an adjustment pawl having end teeth mating with the teeth on the other end of said ratchet gear, an anchor ring in said casing having limited circumferential free movement relative to said adjusting pawl, resilient means between said anchor ring and adjusting pawl pressing the latter toward the ratchet gear but allowing relative axial movement between the adjustment pawl and the ratchet gear, means carried by said casing for turnably retaining said anchor ring thereon, anchor means securing said anchor ring against rotational movement, and means for turning said casing to actuate the brake cam, said casing having axial movement relative to said ratchet gear and cam shaft sufficient to free the operating pawl teeth of the cap from the mating teeth of the ratchet gear.

2. Brake operating and adjusting mechanism as set forth in claim 1, in which said anchor ring retaining means comprises an inwardly flanged end cap secured to said casing.

3. Brake operating and adjusting mechanism comprising in combination, a casing, a cam shaft in said casing, a three-element ratchet gear means for operating said cam by said casing and taking up for wear, said ratchet gear means comprising end-facing ratchet gear teeth, one set of which is carried fixedly by a part fast on the casing, another set being carried by a part connected for limited axial and circumferential movement relative to a fixed anchor part, and two mating sets being carried on said cam shaft and fixed against axial and turning movement thereon, resilient means urging all of the ratchet gear teeth together, said casing having axial movement relative to the cam shaft and its gear teeth sufficient to release the ratchet gear teeth of one set of mating gear teeth.

4. Brake operating and adjusting mechanism as set forth in claim 3, in which the set of gear teeth carried fast on the casing is formed integrally on a removable end cap of the casing.

5. Brake operating and adjusting mechanism comprising in combination with a brake cam shaft, a casing surrounding said cam shaft, a shaft operating ratchet gear secured fast on said cam shaft within said casing for rotating the shaft and being fixed against axial movement thereon, two sets of ratchet teeth on said ratchet gear, one set being axially end-facing, said casing having rotational and axial movement relative to said ratchet gear and shaft, an operating pawl carried fixedly by said casing to move axially and circumferentially with it and having teeth meshing with the end teeth on said ratchet gear, an adjustment pawl carried by said casing and having relative axial and rotational movement therein, a fixed anchor element, the adjustment pawl having a connection with and providing limited axial and circumferential movement relative to the fixed anchor element, said adjustment pawl having teeth meshing with the second set of teeth on said ratchet gear, means normally urging said pawls against the teeth of said ratchet gear, the casing when moved endwise sufficiently relative to the ratchet gear causing the operating pawl teeth carried thereby to be released from their mating teeth on the ratchet gear, the adjustment pawl teeth during the releasing action being firmly pressed against the mating teeth of the ratchet gear.

6. Apparatus as set forth in claim 5, wherein means are provided for forcing said casing endwise, said forcing means comprising an end cap for holding said ratchet gear on said cam shaft, said cap being provided with a circumferentially enlarged portion which is axially spaced outward from the part normally holding the ratchet gear on the cam shaft, said enlarged portion overlying the end of the casing and having axially extending elements at the outer edge.

7. Brake operating and adjusting mechanism comprising in combination, a cam shaft, a cam shaft operating ratchet gear secured on the cam shaft against rotation relative thereto and held against inward axial movement thereon beyond its normal operating position, ratchet gear teeth on the inward side of said ratchet gear, an axially movable operating pawl gear located on the inward side of said ratchet gear and having ratchet teeth on its outward side cooperating with the inward teeth on said ratchet gear, an axially movable adjusting pawl gear located on the outward side of said ratchet gear and having ratchet teeth on its inward side cooperating with the outward teeth on said ratchet gear, an axially movable anchor ring on the outward side of said adjusting ratchet pawl gear and having circumferential movement restraining means therebetween which provides loose movement about equal to normal brake operating movement, means for holding said anchor ring against circumferential movement during normal brake operating conditions, rigid axial connecting means between said anchor ring and said operating pawl gear for moving them together axially but permitting the operating pawl gear to have circumferential movement relative to said anchor ring, said axial connecting means extending freely past said ratchet gear and said adjusting pawl gear, resilient means on the outer side only of the ratchet gear for urging said operating pawl gear and said adjusting pawl gear toward the ratchet gear teeth and for urging said anchor ring away from said adjusting pawl gear, and means for holding the entire assembly on said cam shaft.

8. Brake operating and adjusting mechanism comprising in combination, a cam shaft, a first ratchet gear fixed against rotation and against axial movement on said shaft, said first ratchet gear having ratchet gear teeth on each exial end face thereof, cooperating second and third ratchet gears having ratchet gear teeth meshing with the teeth on the respective ends of said first ratchet gear and being axially and circumferentially movable relative thereto, an operating casing for turning one of said cooperating ratchet gears and carrying it rigidly therewith, said casing enclosing all of said ratchet gears, anchor means for the other of said cooperating ratchet gears having limited axial and circumferential movement relative thereto, said casing constituting rigid connecting means between the ratchet gear carried thereby and said anchor means but allowing relative rotation therebetween, and resilient means on one side only of the first ratchet gear urging said second and third ratchet gears toward opposite sides of said first ratchet gear and for urging said anchor means away from its associated one of said cooperating second and third ratchet gears.

9. Brake operating and adjusting mechanism comprising as a unit assembly adapted to be secured on a cam shaft, in combination, a ratchet gear having a hub adapted to fit on a cam operating shaft and having means for engaging the cam shaft to turn it when secured thereon, a first annular set of ratchet gear teeth on one end of said ratchet gear, a casing surrounding said ratchet gear and having turnable movement relative thereto about its axis, a first pawl carried rigidly by said casing and having end teeth engageable with said first set of ratchet teeth on the end of the ratchet gear for turning it when the pawl and casing are turned, a second annular set of ratchet gear teeth on said ratchet gear, a second pawl housed by said casing and engageable with said second set of ratchet gear teeth on the ratchet gear for holding it against unlimited reverse movement, means retaining the second pawl in the assembly for relative rotation with respect to said casing, an anchor member carried by said casing and adapted to be secured to a fixed part, interengaging means between said second pawl and said anchor member providing limited circumferential movement therebetween, and resilient means urging said pawls against the teeth of said ratchet gear, said resilient means including spring means carried within said casing on the side of said ratchet gear opposite said first or end pawl carried by the casing and acting in a direction to press the first pawl against the first or end set of ratchet teeth on the ratchet gear, the casing and first pawl carried thereby having sufficient endwise movement relative to the ratchet gear to free the pawl teeth from the ratchet teeth when the casing is moved endwise away from the end teeth of the ratchet gear while the ratchet gear is held against endwise movement, the second pawl being retained in engagement with the other set of ratchet gear teeth at this time.

ROY H. SHIVELY.

REFERENCES CITED

The following references are of record in the file of this patent:

UNITED STATES PATENTS

| Number | Name | Date |
| --- | --- | --- |
| 1,755,525 | Tatter | Apr. 22, 1930 |
| 2,379,796 | Freeman et al. | July 3, 1945 |
| 2,385,621 | Freeman et al. | Sept. 25, 1945 |
| 2,385,622 | Freeman et al. | Sept. 25, 1945 |
| 2,481,319 | MacDougall | Sept. 6, 1949 |